United States Patent
Naganawa et al.

(10) Patent No.: US 6,409,934 B1
(45) Date of Patent: Jun. 25, 2002

(54) POLYESTER FIBER TREATMENT AGENT COMPOSITION

(75) Inventors: Tsutomu Naganawa; Isao Ona; Tadashi Takimoto, all of Chiba Prefecture (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 09/694,468

(22) Filed: Oct. 23, 2000

(30) Foreign Application Priority Data

Oct. 29, 1999 (JP) .......................... 11-309033

(51) Int. Cl.⁷ ............................. D06M 15/37
(52) U.S. Cl. .................. 252/8.63; 106/287.11; 252/8.62; 428/447; 524/837; 524/838; 525/477; 528/38
(58) Field of Search ............... 525/477; 524/837, 524/838; 106/287.11; 252/8.61, 8.63; 528/38; 428/447

(56) References Cited

U.S. PATENT DOCUMENTS 4,757,121 A * 7/1988 Tanaka et al.
5,334,653 A 8/1994 Kennoki et al. ............ 524/714
5,707,434 A * 1/1998 Halloran et al.

FOREIGN PATENT DOCUMENTS

| GB | 1296136 | 11/1972 |
|---|---|---|
| GB | 1458319 | 12/1976 |
| JP | 48-017488 | 3/1973 |
| JP | 50-048293 | 4/1975 |
| JP | 58-214585 | 12/1983 |
| JP | 62-041379 | 2/1987 |

\* cited by examiner

Primary Examiner—Robert Dawson
Assistant Examiner—Marc S. Zimmer
(74) Attorney, Agent, or Firm—James L. De Cesare

(57) ABSTRACT

A polyester fiber treatment composition is capable of imparting good handle to polyester fiber, particularly polyester fiber wadding, padding, or fill, and consists of a water-based emulsion containing (A) an aminofunctional organopolysiloxane endblocked by alkoxy groups at its molecular chain terminals, (B) an aminofunctional organopolysiloxane endblocked by silanol groups at its molecular chain terminals, (C) a nonionic surfactant, and (D) water.

2 Claims, No Drawings

POLYESTER FIBER TREATMENT AGENT COMPOSITION

FIELD OF THE INVENTION

This invention relates to polyester fiber treatment agent compositions, and more particularly to a polyester fiber treatment agent composition that provides polyester fiber with properties such as smoothness, rebound, compression recovery, and fatigue resistance.

BACKGROUND OF THE INVENTION

Polyester fiber has a higher compression modulus and a better compression recovery than nylon, acrylic, polyvinyl chloride, and polypropylene fibers. These advantages make polyester fiber well-suited for use as staple fiber for padding, wadding, or filling used in futons, comforters, quilts, pillows, cushions, and stuffed toys, and polyester fiber has become widely employed in these applications. It is known to treat polyester fiber with compositions containing organoalkoxysilanes, e.g., aminofinctional alkoxysilanes or epoxyfunctional alkoxysilanes, to impart a feather-like or fur-like handle to the fiber, Japanese Application Sho 49-133698; Sho 50-48293; Sho 58-214585; and Sho 62-41379. This treatment provides the fiber with properties such as softness, flexibility, smoothness, rebound, and compression recovery. At the same time, the alcohol produced from the alkoxysilane can contaminate the working environment and can create a fire risk.

Polyester fiber can also be treated with a mixture of aminofunctional polysiloxane and epoxyfinctional polysiloxane, Japanese Application Sho 48-17514; and Japanese, Application Hei 5-59673. This method, however, requires a high temperature thermal treatment to produce its intended effects, and the use of heat can cause deterioration of the polyester fiber.

BRIEF SUMMARY OF THE INVENTION

Therefore, the object of the invention is to provide a polyester fiber treatment agent composition that can impart a very good handle to polyester fiber, particularly to polyester fiber wadding, padding, or fill.

These and other features and objects of the invention will become apparent from a consideration of the detailed description.

DETAILED DESCRIPTION OF THE INVENTION

The invention relates to a polyester fiber treatment agent composition that is a water-based emulsion comprising (A) an aminofunctional organopolysiloxane with the general formula

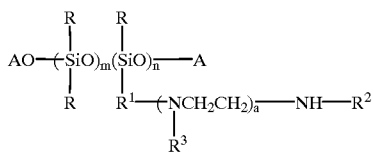

in which R denotes a $C_1$ to $C_{20}$ substituted or unsubstituted monovalent hydrocarbon group, $R^1$ denotes a $C_1$ to $C_{10}$ divalent hydrocarbon group, $R^2$ and $R^3$ are each selected from the group consisting of a hydrogen atom and a $C_1$ to $C_{20}$ substituted or unsubstituted monovalent hydrocarbon group, A denotes a $C_1$ to $C_{20}$ alkyl group, m and n are each integers with a value of at least 1, and a is 0–5, (B) an aminofunctional organopolysiloxane with the general formula

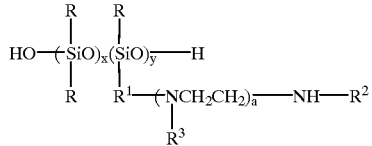

in which R denotes a $C_1$ to $C_{20}$ substituted or unsubstituted monovalent hydrocarbon group, $R^1$ denotes a $C_1$ to $C_{10}$ divalent hydrocarbon group, $R^2$ and $R^3$ are each selected from the group consisting of a hydrogen atom and a $C_1$ to $C_{20}$ substituted or unsubstituted monovalent hydrocarbon group, x and y are each integers with a value of at least 1, and a is 0–5, where the ratio of component (A):component (B) is from 1:0.1 to 1:10 on a weight basis, (C) a nonionic surfactant, and (D) water.

The aminofunctional organopolysiloxane (A) used in the composition is the essential component for conferring durability and rebound to polyester fiber. This organopolysiloxane (A) undergoes an increase in its molecular weight due to the condensation reaction of its terminal alkoxy groups. The larger molecular weight enables it to become intertwined with and anchored to the polyester fiber, resulting in the improvement in durability and rebound. Component (A) has the following general formula.

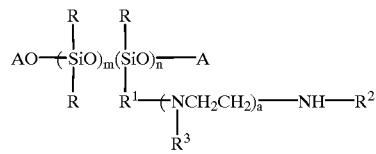

R in the formula denotes a $C_1$ to $C_{20}$ substituted or unsubstituted hydrocarbon group and can is exemplified by saturated aliphatic hydrocarbon groups such as methyl, ethyl, propyl, butyl, octyl, decyl, dodecyl, and tetradecyl; unsaturated aliphatic hydrocarbon groups such as vinyl and allyl; saturated alicyclic hydrocarbon groups such as cyclopentyl and cyclohexyl; aromatic hydrocarbon groups such as phenyl, tolyl, and naphthyl; and groups afforded by replacing part of the hydrogen atoms in any of the preceding groups with halogen or epoxyfunctional organic groups. The R groups in the formula may all be the same or may be different, but R is preferably methyl.

$R^1$ for component (A) denotes a $C_1$ to $C_{10}$ divalent hydrocarbon group. $R^1$ can be exemplified by alkylene groups such as ethylene, propylene, and butylenes; and by arylene groups such as phenylene, but it is preferably ethylene or propylene.

$R^2$ and $R^3$ are each a hydrogen atom or a $C_1$ to $C_{20}$ substituted or unsubstituted monovalent hydrocarbon group. Monovalent hydrocarbon groups encompassed by $R^2$ and $R^3$ can be exemplified by the same groups as R. $R^2$ and $R^3$ can be the same or they may differ.

A in the formula for (A) denotes a $C_1$ to $C_{20}$ alkyl group such as methyl, ethyl, propyl, butyl, octyl, decyl, dodecyl, and tetradecyl.

The subscripts m and n are each integers with a value of at least 1. While the upper limit on these subscripts is not critical, in order to impart softness, flexibility, smoothness, and compression recovery, the subscripts preferably have a value to provide a kinematic viscosity at 25° C. for the organopolysiloxane of at least 50 mm²/s, and more preferably in the range of 300 to 30,000 mm²/s. Subscript a is an integer with a value of 0–5, but it will generally be 0 or 1.

The siloxane unit bonding in the formula for component (A) can be random or block. One method for synthesizing aminofunctional organopolysiloxane (A) is reaction of a diorganopolysiloxane or diorganosilane with the general formula

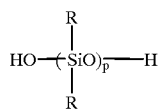

in which R is the same as defined above, and p is an integer with a value of at least 1; and an organoalkoxysilane with the general formula

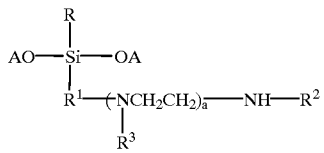

in which R, $R^1$, $R^2$, $R^3$, A, and a, are the same as defined above.

The diorganopolysiloxane used in this synthesis can be exemplified by an hydroxyl-endblocked dimethylpolysiloxane having a kinematic viscosity at 25° C. of 10–30,000 mm²/s. The organoalkoxysilane used in this synthesis can be exemplified by the composition N-β-(aminoethyl)-γ-aminopropylmethyldimethoxysilane. The diorganopolysiloxane and the organoalkoxysilane can be reacted with each other with heating, or with heating in the presence of a basic catalyst followed by neutralization of the basic catalyst with an acid. The basic catalyst can be exemplified by potassium hydroxide, sodium hydroxide, or lithium hydroxide.

The following compositions are examples of aminofunctional organopolysiloxane (A).

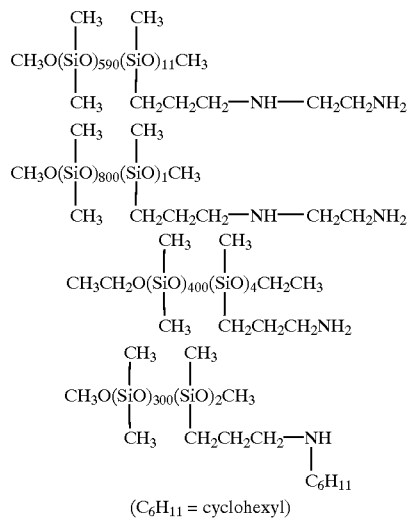

($C_6H_{11}$ = cyclohexyl)

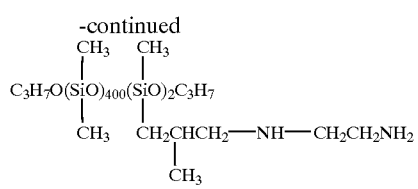

Aminofunctional organopolysiloxane (B) is the essential component for conferring an excellent smoothness, flexibility, and softness to the polyester fiber. An additional and significant improvement in the rebound characteristics can be induced by reaction of a portion of hydroxyl in organopolysiloxane (B) and alkoxy in component (A).

Component (B) is defined by the general formula

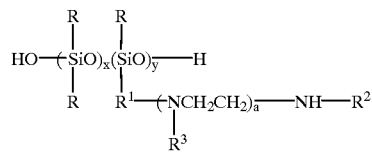

in which R, $R^1$, $R^2$, $R^3$, and a, are the same as defined above. Subscripts x and y are each integers with a value of at least 1. While the upper limits on the value of these subscripts is not critical, in order to impart softness, flexibility, smoothness, and compression recovery, it should have a value to provide a kinematic viscosity at 25° C. for the organopolysiloxane of at least 50 mm²/s, more preferably in the range from 300–30,000 mm²/s. The siloxane unit bonding for component (B) can be random or block.

One method for synthesizing aminofunctional organopolysiloxane (B) comprises the base catalyzed reaction of a diorganosilane or diorganosiloxane with the general formula

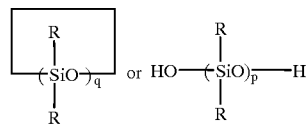

in which R and p are the same as defined above, and q is an integer with a value of at least 3; with the hydrolysis and condensation product of an organoalkoxysilane with the general formula

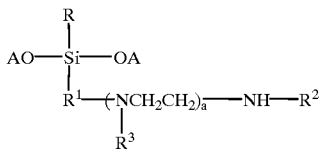

in which R, $R^1$, $R^2$, $R^3$, A, and a, are the same as defined above.

The diorganosiloxane used in this synthesis is exemplified by hexamethylcyclotrisiloxane, octamethylcyclotetrasiloxane, and hydroxyl endblocked dimethylpolysiloxanes. The alkoxysilane hydrolysis and condensation product can be exemplified by silanol functional hydrolysis and condensation products afforded by hydrolysis of N-β-(aminoethyl)-γ-aminopropylmethyldimethoxysilane in the presence of excess water. The basic catalyst can be exemplified by potassium hydroxide, sodium hydroxide, and lithium hydroxide. The reaction is generally carried out using heat. Completion of the reaction is followed by neutralization of the basic catalyst with an acid.

The following compounds are examples of aminofunctional organopolysiloxane (B).

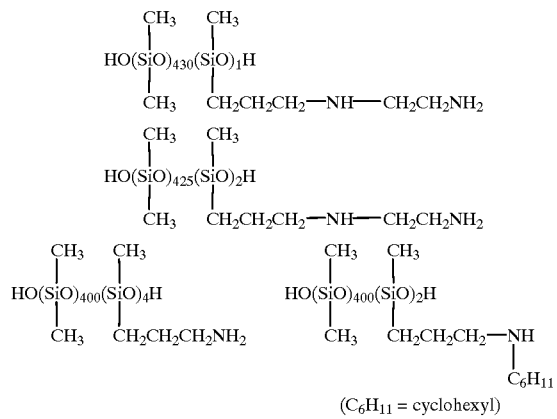

($C_6H_{11}$ = cyclohexyl)

The benefits of this invention are achieved by using the combination of aminofunctional organopolysiloxanes (A) and (B). The use of (A) alone results in an excessive amount of condensation polymerization among polysiloxane molecules, which while leading to an improvement in rebound, also results in a lower smoothness, softness, and flexibility. The use of (B) alone can to some degree produce a good smoothness, softness, and flexibility, but it is not durable. In addition, no rebound is obtained with the use of only (B). The (A):(B) component blending ratio on a weight basis should be in the range of 1:0.1 to 1:10.

The nonionic surfactant (C) used in the composition functions to disperse components (A) and (B) in water and produces the water-based emulsion. Component (C) can be exemplified by polyoxyethylene alkyl ethers and polyoxyethylene-polyoxypropylene alkyl ethers in which the alkyl group is lauryl, cetyl, stearyl, or trimethylnonyl; polyoxyethylene alkylphenyl ethers in which the alkylphenyl group is nonylphenyl or octylphenyl; polyethylene glycol/aliphatic acid esters afforded by addition polymerization of ethylene oxide with an aliphatic acid such as stearic acid or oleic acid; polyoxyethylene glycerol aliphatic acid esters; and polyglycerol aliphatic acid esters. A single type of nonionic surfactant or combination of two or more types of nonionic surfactants can be used as component (C). Component (C) is preferably present in the composition at 3–30 weight parts for each 100 weight parts of the total of components (A) and (B).

The water (D) in the composition functions as the dispersing medium for components (A), (B), and (C). At a minimum, water should be present in sufficient quantity to enable the composition to be converted to a water-based emulsion. In preferred embodiments, water is used at 50–20,000 weight parts for each 100 weight parts of the total of components (A), (B), and (C).

The composition can be prepared by first preparing separate emulsions of components (A) and (B) using nonionic surfactant (C) and then mixing the two emulsions, or by first mixing components (A) and (B) and then emulsifying the mixture using nonionic surfactant (C). The composition can be prepared using emulsifying devices such as homomixers, homogenizers, propeller-type stirrers, line mixers, or colloid mills.

While the composition is a water-based emulsion containing components (A) through (D), it may contain other additional components such as cationic surfactants, antistatics, non-silicone organic softeners, dialkylpolysiloxanes, other organoalkoxysilanes or their partial hydrolyzates, preservatives, and antimolds. However, the dialkylpolysiloxanes should have a kinematic viscosity at 25° C. of 50–5,000,000 $mm^2/s$, and should not include a high degree of polymerization or organopolysiloxanes with kinematic viscosities in excess of 5,000,000 $mm^2/s$. Should yellowing caused by the amino group in component (A) or (B) prove to be a problem, it can be ameliorated by including a compound reactive with the amino group such as an organic acid or anhydride, or an. epoxy compound.

Polyester fiber can be treated with the composition by first diluting the composition to a suitable concentration; applying it by dipping, spraying, or roll application to the polyester fiber in staple fiber, tow, yarn, woven, knitted, or nonwoven form, and drying and heating at 120–180° C. The optimal add-on of the composition with reference to polyester fiber is 0.1–3.0 weight percent as solids in the composition.

EXAMPLES

The invention is explained in more detail by the following working examples. In the examples, parts denotes weight parts, and values for kinematic viscosity were measured at 25° C.

Synthesis Example 1

Synthesis of Aminofunctional Polyorganosiloxane A-1

950 g of an hydroxyl endblocked dimethylpolysiloxane with a kinematic viscosity of 100 $mm^2/s$, and 50 g of N-β-(aminoethyl)-γ-aminopropylmethyldimethoxysilane were placed in a one liter reactor and heated to 80° C. with stirring. Once 80° C. had been reached, 0.3 g of a 50 weight percent aqueous potassium hydroxide solution was added. Then, while injecting nitrogen at a flowrate of 200 mL/minute from a small tube immersed in the liquid, the reaction mixture was maintained for 6 hours at 80° C. under a reduced pressure of 60 mmHg, to remove water and methanol. Neutralization was subsequently carried out by addition of 0.2 g of acetic acid. This synthesis provided an aminofunctional polyorganosiloxane with the average formula:

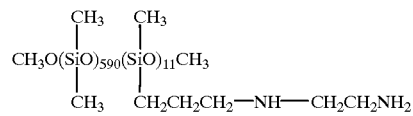

This aminofunctional polyorganosiloxane had a kinematic viscosity of 3,950 $mm^2/s$ and was designated aminofunctional polyorganosiloxane A-1.

Synthesis Example 2

Synthesis of Aminofunctional Polyorganosiloxane A-2

980 g of a hydroxyl endblocked dimethylpolysiloxane with a kinematic viscosity of 100 $mm^2/s$, and 20 g of N-β-(aminoethyl)-γ-aminopropylmethyldimethoxysilane, were placed in a one liter reactor, heated to 80° C. with stirring, and reacted for 2 hours. After the reaction, nitrogen was injected at a flowrate of 200 mL/minute from a small tube immersed in the liquid, to provide an aminofunctional polyorganosiloxane with the average formula:

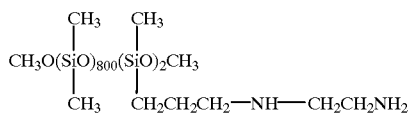

This aminofunctional polyorganosiloxane had a kinematic viscosity of 9,900 mm$^2$/s and was designated aminofunctional polyorganosiloxane A-2.

Synthesis Example 3

Synthesis of Aminofunctional Polyorganosiloxane B-1

The following were placed in a one liter reactor and heated to 80° C. with stirring: 990 g of an hydroxyl endblocked dimethylpolysiloxane with a kinematic viscosity of 100 mm$^2$/s, and 10 g of the hydrolysis and condensation product produced by the hydrolysis of N-β-(aminoethyl)-γ-aminopropylmethyldimethoxysilane using an excess of water. Once 80° C. had been reached, 0.3 g of a 50 weight percent aqueous potassium hydroxide solution was added. The reaction mixture was then maintained for 6 hours at 80° C. while injecting nitrogen at a flowrate of 200 mL/minute from a small tube immersed in the liquid. Neutralization was subsequently carried out by addition of 0.2 g acetic acid. This synthesis provided aminofunctional polyorganosiloxane with the average formula:

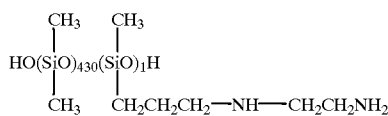

This aminofunctional polyorganosiloxane had a kinematic viscosity of 1,400 mm$^2$/s and was designated aminofunctional polyorganosiloxane B-1.

Synthesis Example 4

Synthesis of Aminofunctional Polyorganosiloxane B-2

The following were placed in a one liter reactor and heated to 140° C. with stirring: 980 g of octamethylcyclotetrasiloxane, 0.3 g of a 50 weight percent aqueous potassium hydroxide solution, and 20 g of the hydrolysis and condensation product produced by hydrolysis of N-β-(aminoethyl)-γ-aminopropylmethyldimethoxysilane using an excess of water. Once 140° C. had been reached, the reaction mixture was maintained for 2 hours at that temperature. Neutralization was subsequently carried out by addition of 0.2 g acetic acid. This synthesis provided aminofunctional polyorganosiloxane with the average formula:

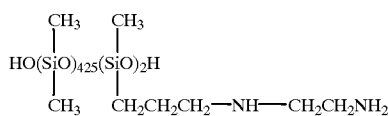

This aminofunctional polyorganosiloxane had a kinematic viscosity of 1,400 mm$^2$/s and was designated aminofunctional polyorganosiloxane B-2.

Synthesis Example 5

Synthesis of Aminofunctional Polyorganosiloxane C

The following were placed in a one liter reactor and heated to 140° C. with stirring: 940 g of octamethylcyclotetrasiloxane, 0.3 g of a 50 weight percent aqueous potassium hydroxide solution, 40 g of a trimethylsiloxy endblocked polydimethylsiloxane with a kinematic viscosity of 10 mm$^2$/s, and 20 g of the hydrolysis and condensation product produced by hydrolysis of N-β-(aminoethyl)-γ-aminopropylmethyldimethoxysilane using an excess of water. Once 140° C. had been reached, the reaction mixture was maintained for 2 hours at that temperature. Neutralization was subsequently carried out by addition of 0.2 g of acetic acid. This synthesis provided aminofunctional polyorganosiloxane with the average formula:

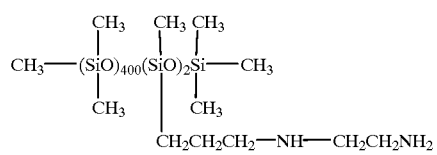

This aminofunctional polyorganosiloxane had a kinematic viscosity of 800 mm$^2$/s and was designated aminofunctional polyorganosiloxane C.

Examples 1–4

300 g of aminofunctional polyorganosiloxane A-1 prepared in Synthesis Example 1, and 40 g of polyoxyethylene (6) lauryl ether nonionic surfactant, were emulsified and dispersed in 660 g of water using a homomixer, yielding an emulsion designated emulsion A-1.

Emulsions A-2, B-1, B-2, and C, were similarly prepared by emulsification and dispersion, respectively, of aminofunctional polyorganosiloxanes A-2, B-1, B-2, and C, prepared in Synthesis Examples 2–5.

Polyester fiber treatment agent compositions were prepared by mixing selected emulsions as indicated in Table 1 in proportions shown in Table 1. Each of the resulting compositions was then applied to polyester staple fiber with a fineness of 6 denier and a fiber length of 65 mm, for application as futon/quilt wadding. Application was carried out by spraying with a sprayer to provide an aminofunctional polyorganosiloxane add-on amount of 0.5 weight percent. Application was followed by drying at room temperature and then heat treatment for 5 minutes at 150° C. The treated polyester futon/quilt wadding was opened using a LABORMIXER from the TEXTEST Company, and a layered futon/quilt wadding was prepared. This wadding was measured for specific volume (mL/g), compressibility (percent), and recovery (percent), using measurement methods described in Japanese Industrial Standard (JIS) L-2001. The handle of the futon/quilt wadding was also evaluated by tactile sensation using a scale shown below.

The results of these measurements and evaluation are also shown in Table 1.

++: a feather-like handle that was very soft, flexible, and smooth.

+: a soft, flexible, and smooth handle.

Δ: the handle is coarse and hard with some deterioration in softness, flexibility, and smoothness.

×: the handle is coarse and hard with a poor softness, flexibility, and smoothness Comparative Examples 1–5

Following the procedure in Example 1, each of the emulsions A-1, A-2, B-1, B-2, and C, which were prepared as described in Example 1, was used to treat polyester staple fiber for application as a futon/quilt wadding, and the layered futon/quilt wadding was prepared as described in Example 1. The treated futon/quilt wadding was measured for specific volume (mL/g), compressibility (percent), and recovery (percent), as described in Example 1, and were evaluated for handle as described in Example 1. These results are shown in Table 1, which also shows the results of measurements on untreated futon/quilt wadding.

TABLE 1

|  | Working Examples | | | | Comparative Examples | | | | | Untreated |
|---|---|---|---|---|---|---|---|---|---|---|
|  | 1 | 2 | 3 | 4 | 1 | 2 | 3 | 4 | 5 |  |
| Emulsion A-1 | 50 | — | 50 | — | 100 | — | — | — | — | — |
| Emulsion A-2 | — | 50 | — | 50 | — | 100 | — | — | — | — |
| Emulsion B-1 | 50 | 50 | — | — | — | — | 100 | — | — | — |
| Emulsion B-2 | — | — | 50 | 50 | — | — | — | 100 | — | — |
| Emulsion C | — | — | — | — | — | — | — | — | 100 | — |
| Specific Volume (mL/g) | 118 | 115 | 118 | 114 | 118 | 115 | 101 | 103 | 100 | 90 |
| Compressibility (percent) | 85 | 83 | 85 | 84 | 85 | 83 | 72 | 75 | 69 | 49 |
| Recovery (percent) | 94 | 93 | 94 | 94 | 93 | 93 | 88 | 88 | 89 | 85 |
| Handle | + +/+ | + +/+ | + + | + + | Δ | Δ | +/Δ | +/Δ | Δ | × |

TABLE 2

|  | Working Examples | | | Comparative Examples | | | |
|---|---|---|---|---|---|---|---|
|  | 5 | 6 | 7 | 6 | 7 | 8 | 9 |
| Emulsion A-1 | 20 | 80 | — | 5 | 95 | — | — |
| Emulsion A-2 | — | — | 80 | — | — | 5 | 5 |
| Emulsion B-1 | 80 | 20 | 20 | 95 | 5 | 95 | — |
| Emulsion C | — | — | — | — | — | — | 95 |
| Specific Volume (mL/g) | 116 | 117 | 117 | 105 | 115 | 101 | 100 |
| Compressibility (percent) | 84 | 85 | 85 | 75 | 83 | 72 | 70 |
| Recovery (percent) | 94 | 94 | 94 | 89 | 93 | 88 | 88 |
| Handle | + + | + +/+ | + +/+ | Δ | Δ | +/Δ | Δ |

Examples 5–7

Polyester fiber treatment agent compositions were prepared by mixing emulsion B-1 with emulsion A-1 or A-2 in the proportions shown in Table 2. The emulsions A-1, A-2, and B-2, used in these examples refers to emulsions prepared as described in Example 1. Following the procedure described in Example 1, each composition was used to treat polyester staple fiber for application as futon/quilt wadding, and layered futon/quilt waddings were prepared. These futon/quilt waddings were measured for their specific volume (mL/g), compressibility (percent), and recovery (percent), as described in Example 1, and were also evaluated for handle as described in Example 1. These results are shown in Table 2.

Comparative Examples 6–9

Polyester fiber treatment agent compositions were prepared by mixing emulsions A-1, A-2, B-1, and C, in the proportions shown in Table 2. The emulsions A-1, A-2, B-1, and C, used in these Comparative Examples refers to emulsions prepared as described in Example 1. Following the procedure described in Example 1, each composition was used to treat polyester staple fiber for application as futon/quilt wadding, and the layered futon/quilt wadding was prepared as described in Example 1. These futon/quilt waddings were measured for their specific volume (mL/g), compressibility (percent), and recovery (percent), as described in Example 1, and were also evaluated for their handle as described in Example 1. The results are shown in Table 2.

Example 8

A polyester fiber treatment agent composition was prepared by emulsifying and dispersing the following components in 660 g of water using a homomixer: 150 g of the aminofunctional polyorganosiloxane A-1 synthesized as described in Synthesis Example 1, 150 g of the aminofunctional polyorganosiloxane B-1 synthesized as described in Synthesis Example 3, and 40 g polyoxyethylene (6) lauryl ether nonionic surfactant. This composition was used to treat polyester staple fiber for application as futon/quilt wadding as described in Example 1, and the layered futon/quilt wadding was fabricated as described in Example 1. When the futon/quilt wadding was evaluated by tactile sensation for smoothness and rebound, it was found to have a feather-like handle with good smoothness and rebound.

Example 9

A polyester fiber treatment agent composition was prepared by emulsifying and dispersing the following components in 660 g of water using a homomixer: 150 g of the aminofunctional polyorganosiloxane A-1 synthesized as described in Synthesis Example 1, 150 g of the aminofunctional polyorganosiloxane B-2 synthesized as described in Synthesis Example 4, and 40 g polyoxyethylene (6) lauryl ether nonionic surfactant. This composition was used to treat polyester staple fiber for application as futon/quilt wadding as described in Example 1, and the layered futon/quilt wadding was fabricated as described in Example 1. When the futon/quilt wadding was evaluated by tactile sensation for smoothness and rebound, it was found to have a feather-like handle with good smoothness and rebound.

Comparative Example 10

40 g of polyoxyethylene(6 mol) lauryl ether was added to a mixture of 250 g of isoparaffin, and 150 g of a trimethylsilyl endblocked dimethylpolysiloxane with a kinematic viscosity of 7,000,000 mm²/s. The mixture was emulsified and dispersed in 560 g of water using a planetary mixer to provide emulsion D. Emulsion D and the composition prepared in Example 9 were mixed in a 1:1 ratio to provide a polyester fiber treatment agent composition. This composition was used to treat polyester staple fiber for application as futon/quilt wadding as described in Example 1, and the layered futon/quilt wadding was fabricated as described in Example 1. When the futon/quilt wadding was evaluated by tactile sensation for its smoothness and rebound, it was found to have an unacceptable handle with a smoothness and rebound inferior to futon/quilt wadding obtained in Example 9.

The polyester fiber treatment agent composition according to this invention is capable of imparting excellent softness, flexibility, smoothness, and rebound, to polyester fiber, because it is a combination of two different aminofunctional organopolysiloxanes (A) and (B). As a result, futon/quilt wadding or padding produced from polyester fiber fill treated with the composition exhibits excellent feather-like handle. More particularly, the polyester fiber treatment agent composition of this application has the ability to confer even better softness, flexibility, smoothness, and rebound to polyester fiber, because it comprises the combination of the two different aminofunctional organopolysiloxanes (A) and (B), synthesized by methods described herein. Consequently, futon/quilt wadding or padding produced from polyester fiber fill treated with the composition exhibits even better feather-like handle.

Other variations may be made in compounds, compositions, and methods described herein without departing from the essential features of the invention. The embodiments of the invention specifically illustrated herein are exemplary only, and not intended as limitations on their scope, except as defined in the appended claims.

What is claimed is:

1. A polyester fiber treatment composition comprising a water-based emulsion containing (A) an aminofunctional organopolysiloxane of the formula

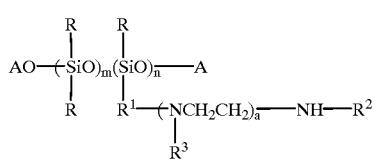

in which R is a $C_1$ to $C_{20}$ subtituted or unsubstituted monovalent hydrocarbon group, $R^1$ is a $C_1$ to $C_{10}$ divalent hydrocarbon group, $R^2$ and $R^3$ are each the hydrogen atom or a $C_1$ to $C_{20}$ unsubstituted monovalent hydrocarbon group, A is a $C_1$ to $C_{20}$ alkyl group, m and n are each at least 1, and a is 0–5;

(B) an aminofunctional organopolysiloxane of the formula

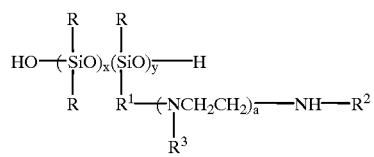

in which R is a $C_1$ to $C_{20}$ subtituted or unsubstituted monovalent hydrocarbon group, $R^1$ is a $C_1$ to $C_{10}$ divalent hydrocarbon group, $R^2$ and $R^3$ are each the hydrogen atom or a $C_1$ to $C_{20}$ unsubstituted monovalent hydrocarbon group, x and y are each at least 1, and a is 0–5; where (A) and (B) are present in the ratio of 1:0.1 to 1:10 on a weight basis;

(C) an nonionic surfactant; and (D) water;

with the proviso that (A) its a reaction product of a diorganopolysiloxane or a diorganosilane of the formula

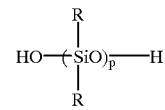

in which R is the same as defined above in (A), and p is at least one; and an organoalkoxysilane of the formula

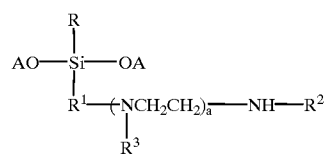

in which R, $R^1$, $R^2$, $R^3$, A, and a, are the same as defined above in (A);

and with the further proviso that (B) is a base catalyzed reaction product of a diorganosilane Or a diorganosiloxane of the formula

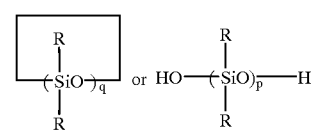

in which R and p are the same as defined above in (B), and q is at least 3; and a hydrolysis and condensation product of an organoalkoxysilane of the formula

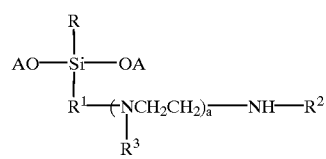

in which R, $R^1$, $R^2$, $R^3$, A, and a, are the same as defined above in (B).

2. A method of treating polyester fiber wadding, padding, or filling, comprising applying to the polyester fiber wadding, padding, or filling, the composition as defined in claim 1.